United States Patent
Ikeda et al.

(10) Patent No.: US 6,422,570 B2
(45) Date of Patent: Jul. 23, 2002

(54) LIP TYPE SEAL

(75) Inventors: Yasuhiro Ikeda, Takahashi; Takeshi Yamada; Takayuki Imai, both of Kariya, all of (JP)

(73) Assignees: Eagle Industry Co., Ltd., Tokyo; Kabushiki Kaisha Toyoda Jidoshokki Seisakusho, Kariya, both of (JP)

( * ) Notice: Subject to any disclaimer, the term of this patent is extended or adjusted under 35 U.S.C. 154(b) by 0 days.

(21) Appl. No.: 09/809,353

(22) Filed: Mar. 16, 2001

(30) Foreign Application Priority Data

Mar. 17, 2000 (JP) .................................. 2000-075274

(51) Int. Cl.[7] .............................................. F16J 15/32
(52) U.S. Cl. ..................... 277/552; 277/549; 277/572; 277/579; 277/580
(58) Field of Search ................................ 277/500, 549, 277/551, 552, 561, 572, 579, 580

(56) References Cited

U.S. PATENT DOCUMENTS

| | | | | |
|---|---|---|---|---|
| 2,405,120 A | * | 8/1946 | Evans | 277/551 |
| 4,583,749 A | * | 4/1986 | Hatch | 277/551 |
| 5,921,555 A | * | 7/1999 | Johnston | 277/549 |
| 6,279,914 B1 | * | 8/2001 | Yamanaka et al. | 277/394 |
| 6,290,470 B1 | * | 9/2001 | Okuno et al. | 277/565 |

* cited by examiner

*Primary Examiner*—Anthony Knight
*Assistant Examiner*—Enoch E. Peavey
(74) *Attorney, Agent, or Firm*—Jacobson Holman, PLLC

(57) ABSTRACT

A lip type seal is provided with an outer ring part (31) which is tightly fitted to a seal installation part (12) of a housing (1); a seal main body (32) which is fixed to the outer ring part (31) and whose inner circumferential part extending in a bent state to the side of a sealed space (A) is sealably brought into slidable contact with an outer circumferential surface of a rotary shaft (2) inserted in the housing (1); a rear surface support plate (33) which is arranged on the rear side of the seal main body and whose outer circumferential part together with the seal main body (32) is fixed to the outer ring part (31); and a movable support plate (34) which is engaged movably in a radial direction between the seal main body (32) and the rear surface support plate (33) and whose inner diameter is clearance fitted to the outer circumferential surface of the rotary shaft (2). Therefore, such a gap in which the seal main body (32) enters is not formed between the inner circumferential surface of the movable support plate (34) and the outer circumferential surface of the rotary shaft (2).

5 Claims, 4 Drawing Sheets

(A) conventional structure

(B) present invention structure

US 6,422,570 B2

LIP TYPE SEAL

FIELD OF THE INVENTION

The present invention relates to a lip type seal which seals the circumference of a rotary shaft of various sorts of equipments.

PRIOR ART

As shaft seal technology using a lip type seal, have a structure as shown in FIG. 4 is conventionally known.

In FIG. 4, reference numeral 100 designates a housing of a shaft hole part of an equipment. Numeral 200 designates a lip type seal which is installed to a seal installation part 101 formed on an inner circumferential surface of the housing 100, and seals the circumference of a rotary shaft 102.

In the lip type seal 200, on an inner circumference of an outer ring part 201 with a packing 201a and a metal ring 201b fixed integrally, a seal main body 202 constituted by an annular sheet made of a synthetic resin such as a fluorine resin and a rear surface support plate 203 constituted by an annular metal plate disposed on the rear side of the seal main body 202 are fixed by caulking of the metal ring 201b. The outer ring part 201 is tightly fitted to the inner circumferential surface 101a of the seal installation part 101 in the housing 100 by the packing 201a. An inner circumferential surface of a seal lip 202a formed on the inner circumferential surface of the seal main body 202 and extending to the side of the sealed space A is sealably brought into slidable contact with the outer circumferential surface of the rotary shaft 102. Therefore, a fluid as a seal object within a sealed space A is prevented from leaking to the side of an atmosphere B outside the equipment.

In the above-mentioned conventional lip type seal, the rear surface support plate 203 restricts deformation of the seal main body 202 to the side of the atmosphere B due to pressure of the fluid as the seal object within the sealed space A. However, considering the vibration of the rotary shaft 102 in the diameter direction and an assembling error such that the rotary shaft 102 is inserted in the housing 100 in eccentric state, the rear surface support plate 203 is formed in such a manner as the inner diameter is larger than the outer diameter of the rotary shaft 102 to some extent. Therefore if the significantly high pressure is produced within the sealed space A, the rear surface of an inner circumference bent part 202b of the seal main body 202 enters a gap G between the inner diameter of the rear surface support plate 203 and the rotary shaft 102. In some case, breakage is produced from the entering portion and the sealing performance may be deteriorated. Particularly, in such a case that the housing 100 and the rotary shaft 102 are eccentric to each other, the gap G becomes large in part in the circumferential direction. Therefore, in this part, the above-mentioned entering of the seal main body 202 is liable to occur.

SUMMARY OF THE INVENTION

An object of the present invention is to provide a lip type seal which is excellent in pressure durability, where entering of a seal main body between a rear surface support plate and a rotary shaft due to pressure of a sealed space is prevented.

A lip type seal according to an embodiment of the present invention is provided with an outer ring part which is tightly fitted to a seal installation part of an inner circumference of a housing of an equipment, a seal main body which is fixed to the outer ring part and whose inner circumferential part extending in a bent state to the side of a sealed space is sealably brought into slidable contact with an outer circumferential surface of a rotary shaft inserted in the housing, a rear surface support plate which is arranged on the rear side of the seal main body and whose outer circumferential part together with the seal main body is fixed to the outer ring part, and a movable support plate which is engaged movably in a radial direction between the seal main body and the rear surface support plate and whose inner diameter is clearance fitted to the outer circumferential surface of the rotary shaft. The seal main body is supported through the movable support plate by the rear surface support plate.

In addition, "front surface" in the present specification means a surface facing the sealed space side, "rear surface" means a surface facing the opposite side of the sealed space, "front surface side" means the sealed space side, and "rear surface side" means the opposite side of the sealed space.

DESCRIPTION OF THE EMBODIMENTS

Figure 1:
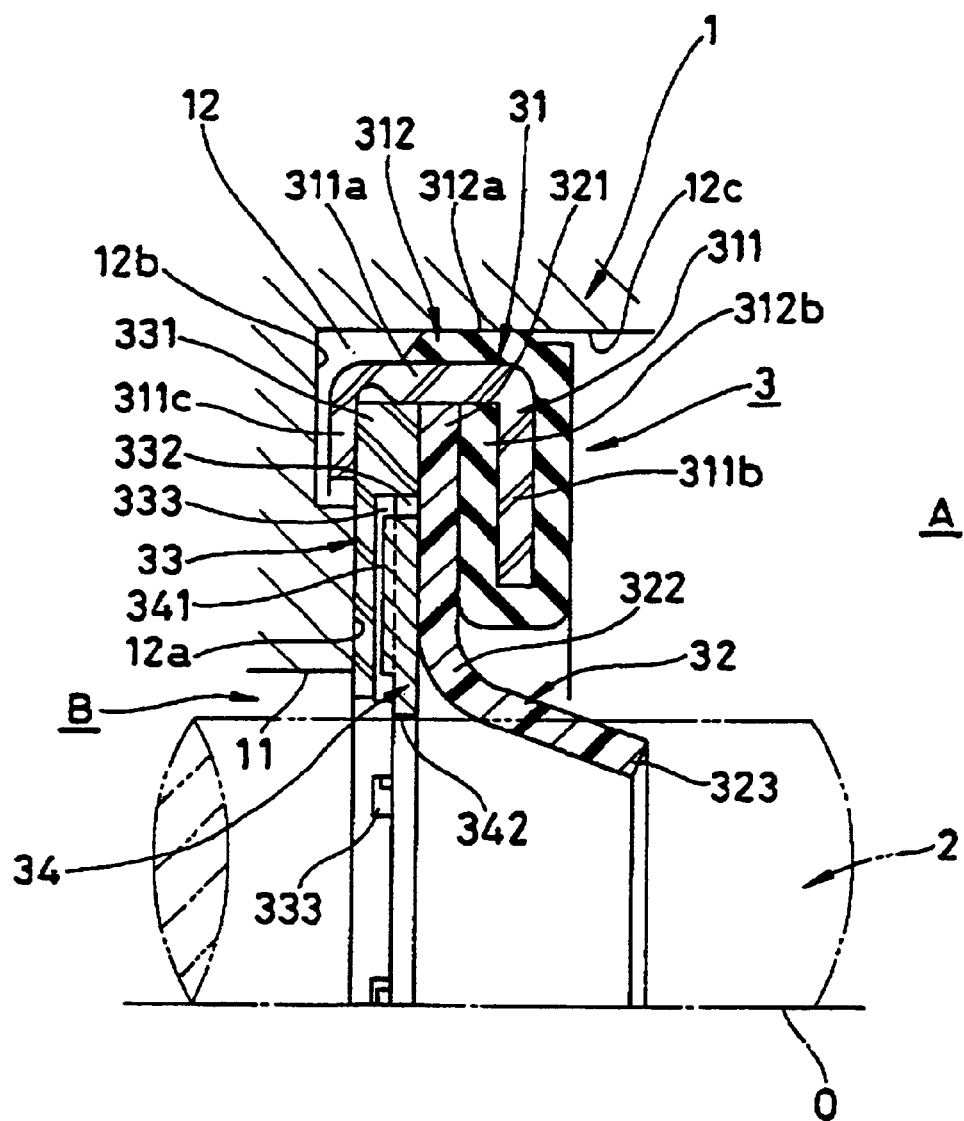
FIG. 1 is a semi sectional view of a preferred embodiment of a lip type seal according to the invention, shown by cutting with a plane passing through an axial center.

FIG. 1 shows a preferred embodiment of a lip type seal according to the present invention. In FIG. 1, reference numeral 1 designates a housing of a shaft hole part of an equipment, numeral 2 designates a rotary shaft which is loosely inserted in a shaft hole 11 of the housing 1 and is rotatable around an axial center O, and numeral 3 designates a lip type seal which is installed to a seal installation part 12 formed enlargedly from the shaft hole 11 of the housing 1, and seals a shaft circumference of the rotary shaft 2, respectively.

The lip type seal 3 has an outer ring part 31 which is force fitted to a cylindrical fit surface 12c of the seal installation part 12 in the housing 1. In an inner circumference of the outer ring part 31, a seal main body 32 and a rear surface support plate 33 arranged on the rear side of the seal main body 32 are fixed. A movable support plate 34 is engaged movably in a radial direction between the seal main body 32 and the rear surface support plate 33.

The outer ring part 31 is provided with a metal ring 311 manufactured by punching and press forming of a metal plate, and a packing 312 made of a rubberlike elastic material vulcanized and bonded integrally in such a manner as an outer circumferential surface of a cylindrical part 311a of the metal ring 311 and a flange part 311b extending from the end part of the front side of the cylinder part 311a to the inner circumferential side are wrapped. In the packing 312, an outer circumferential seal part 312a existing on the outer circumferential side of the cylinder part 311a of the metal ring 311 is brought into close contact with the cylindrical fitting surface 12c of the seal installation part 12 in the housing 1, with a suitable squeeze.

A caulking part 311c bent to the inner circumferential side by caulking is formed at the end part of the rear side of the cylinder part 311a in the metal ring 311. In the seal main body 32 and the rear surface support plate 33, fixed parts 321, 331 on the outer circumferential side are grasped in the close contact state between an inside seal part 312b of the packing 312 existing at the inside surface of the flange part 311b of the metal ring 311 and the caulking part 311c, respectively.

The seal main body 32 comprises an annular sheet made of a synthetic resin of low friction such as a fluorine resin. The disk-shaped fixed part 321 on the outer circumferential side, as previously described, is grasped and fixed together with the rear surface support plate 33 between the inside seal part 312b of the packing 312 in the outer ring part 31 and the caulking part 311c of the metal ring 311. A seal lip part 323 extends from the inner circumference of the fixed part 321 through a bent part 322 in the shape of arc toward the right side in the figure, that is, toward the side of a sealed space A. The seal lip part 323 in the original state being not installed, is formed in a taper shape such that the side of the bent part 322 has a larger diameter than that of the rotary shaft 2 and the top end side thereof has a smaller diameter than that of the rotary shaft 2.

Figure 2:
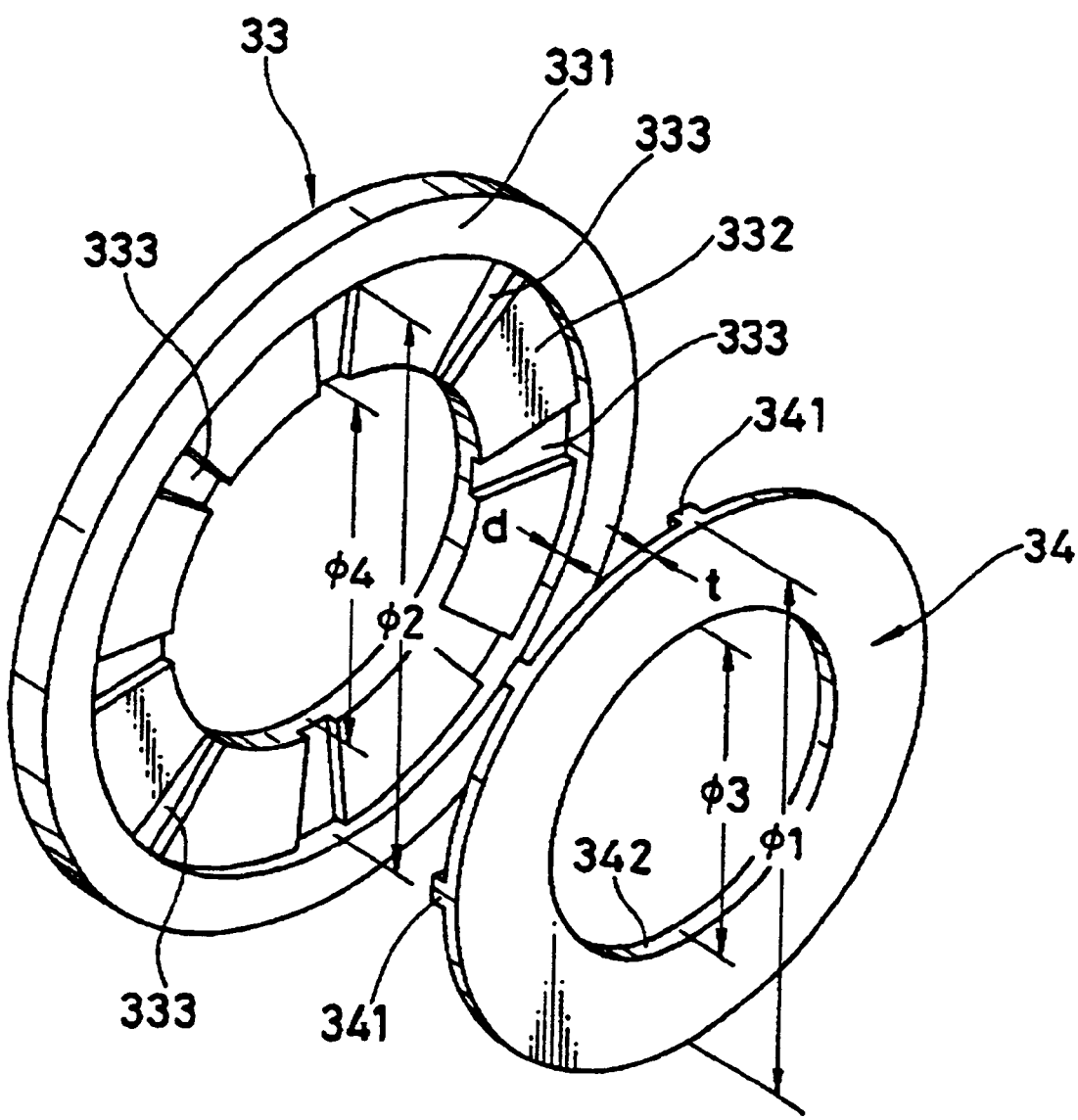
FIG. 2 is a perspective view showing a rear surface support plate and a movable support plate in the lip type seal.

The rear surface support plate 33 comprises a metal plate. The fixed part 331 on the outer circumferential side, as previously described, is grasped and fixed together with the fixed part 321 of the seal main body 32 between the inside seal part 312b of the packing 312 in the outer ring part 31 and the caulking part 311c of the metal ring 311. Its inner diameter is suitably formed larger than the outer diameter of the rotary shaft 2 in consideration of the vibration of the rotary shaft 2 in a radial direction or relative eccentricity between the housing 1 and the rotary shaft 2. Also, in the rear surface support plate 33 as more clearly shown in a perspective view of FIG. 2, an annular recess 332 is formed with step difference on the front surface of the inner circumferential side of the fixed part 331. A plurality of engaging grooves 333 extending in a radial direction are formed at regular phase intervals on the annular recess 332.

The movable support plate 34 is made of a synthetic resin which is more excellent than a fluorine resin in mechanical property and has an abrasion resisting property. The thickness t in the axial direction is equivalent to the depth d in the axial direction of the annular recess 332 of the rear surface support plate 33. The outer diameter $\phi 1$ is smaller than the diameter $\phi 2$ of the annular recess 332. The inner diameter $\phi 3$ is smaller than the inner diameter $\phi 4$ of the rear surface support plate 33 and slightly larger than the outer diameter of the rotary shaft 2. Also, at the rear surface of the movable support plate 34, a plurality of engaging stripes 341 extending in the radial direction and being thinner than the engaging grooves 333 of the rear surface support plate 33 are formed at phase intervals corresponding to the engaging grooves 333.

The movable support plate 34 is accommodated in the annular recess 332 of the rear surface support plate 33. Each engaging stripe 341 at the rear surface is loosely fitted to each engaging groove 333 in the annular recess 332. Thereby, the detention of rotation is conducted. The inner circumferential surface 342 is interposed between the seal main body 32 and the rear surface support plate 33 in the state of the clearance fit to the outer circumferential surface of the rotary shaft 2, with a very small gap. Also the movable support plate 34 has the outer diameter $\phi 1$ smaller than the diameter $\phi 2$ of the annular recess 332. The engaging groove 333 is larger than the engaging stripe 341 in width. Thereby, it can be moved in a radial direction within the prescribed range with respect to the rear surface support plate 33.

In FIG. 1, the seal installation part 12 of the housing 1 comprises a support projection 12a facing the side of the sealed space A within the equipment, an outer circumferential recess 12b formed on the outer circumferential side in such a manner as to be retreated in an axial direction, and the cylindrical fitting surface 12c extending from the outer diameter end to the side of the sealed space A. The front surface of the support projection 12a forms a plane substantially crossing at right angles to the axial center O. Its outer diameter is smaller than the inner diameter of the caulking part 311c of the metal ring 311 in the outer ring part 31 of the lip type seal 3. Height in an axial direction, in other words, depth in an axial direction of the outer circumferential recess 12b is formed in the dimension more than the thickness of the caulking part 311c.

In the lip type seal 3, the outer ring part 31 in the outer circumferential seal part 312a of the packing 312 is force fitted to the cylindrical fitting surface 12c of the seal installation part 12, such that the rear surface of the rear surface support plate 33 abuts on the front surface of the support projection 12a of the seal installation part 12 in the housing 1. In this state, the caulking part 311c of the metal ring 311 in the outer ring part 31 is loosely fitted to the outer circumferential recess 12b of the seal installation part 12.

On the other hand, in the seal main body 32 made of a synthetic resin of low friction such as PTFE, the seal lip part 323 is deformed from the taper shape shown in FIG. 1 into a substantially cylindrical shape due to insertion of the rotary shaft 2 so as to be enlarged in diameter. The inner circumferential surface of the seal lip part 323 is brought into slidably close contact with the outer circumferential surface of the rotary shaft 2. Thereby the shaft seal function is exhibited in that a fluid in the sealed space A within the equipment is prevented from leaking to the side of an atmosphere B outside the equipment.

The fluid pressure of the sealed space A acts such that the lip type seal 3 as a whole is pressed toward the side of the atmosphere B. In the lip type seal 3, the rear surface support plate 33 abuts on the support projection 12a of the seal installation part 12 in the housing 1, whereby the displacement in an axial direction of the lip type seal 3 to the side of the atmosphere B is restricted. Therefore, the rear surface support plate 33 is not subjected to such bending deformation that the rear surface support plate 33 is deformed to the side of the atmosphere B with the caulking part 311c of the metal ring 311 in the outer ring part 31 as a fulcrum. As a result, the seal main body 32 is held in the normal installation position.

The seal main body 32 is pushed to the movable support plate 34 by the fluid pressure of the sealed space A. The seal main body 32 is supported to the rear surface support plate 33 through the movable support plate 34. If the sealed space A becomes significantly high in pressure, the rear surface of the bent part 322 of the seal main body 32 becomes also in such a state as to be pushed to the front surface of the inner diameter part of the foregoing movable support plate 34.

The inner circumferential surface of the movable support plate 34 is in such a state as to be clearance fitted to the rotary shaft 2. Moreover, the movable support plate 34 is engaged with the rear surface support plate 33 movably in a radial direction. Consequently, when the rotary shaft 2 is vibrated in a radial direction or inserted in the housing 1 relatively in an eccentric (center deviated) state, the movable support plate 34 can be deformed accordingly in the radial direction. Therefore, a gap in which the seal main body 32 enters is not formed on the inner diameter side of the movable support plate 34. Such a state can be effectively prevented that the rear surface of the inner circumferential bent part 322 of the seal main body 32 enters the gap G between the inner diameter of the rear surface support plate 33 and the rotary shaft 2 and is damaged.

Also, the rotary shaft 2 may contact with the inner circumferential surface of the movable support plate 34 due to center deviation, vibration in a radial direction or the like. However, as above described, the movable support plate 34 can be displaced succeeding to the eccentricity of the rotary shaft 2. Moreover it is made of a synthetic resin material excellent in an abrasion resisting property. Thereby, the abrasion due to the contact with the rotary shaft 2 can be suppressed. Therefore, the enlarging of the gap between the inner circumferential surface of the movable support plate 34 and the rotary shaft 2 can be prevented effectively.

Figure 3:
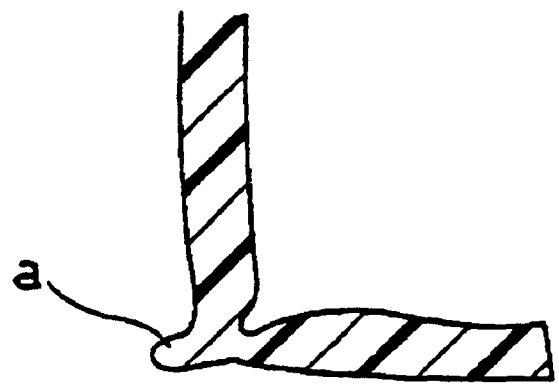
FIGS. 3 (A) (B) are fragmentary sectional views showing a seal main body deformed by high pressure as a result of performing a pressure proof test of a lip type seal in the conventional structure and the invention structure respectively.
Figure 3:
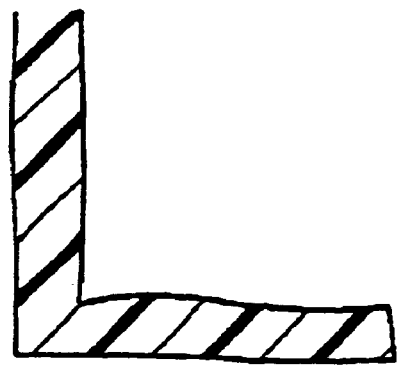
Figure 4:
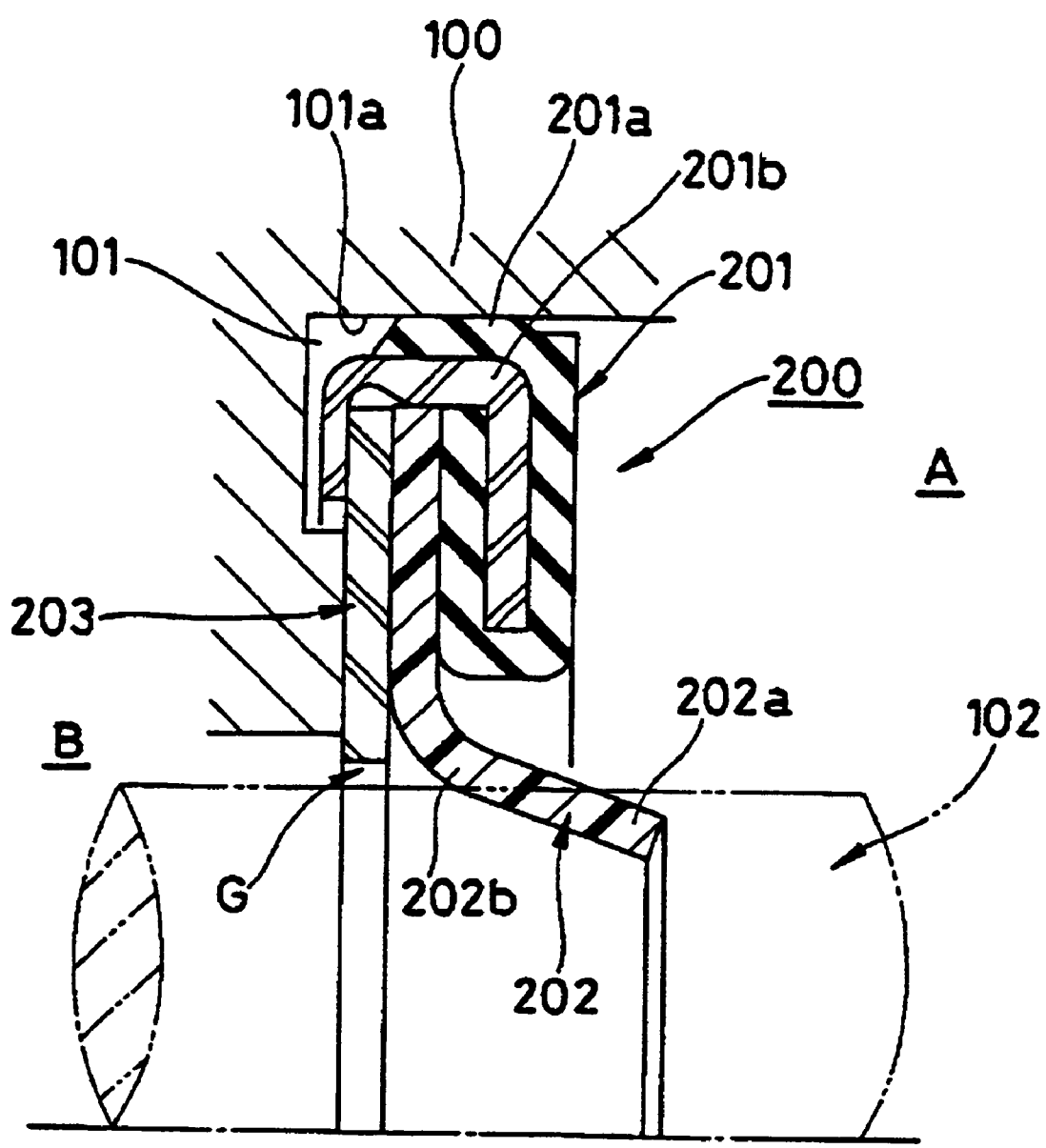
FIG. 4 is a semi sectional view of a lip type seal in the prior art, shown by cutting with a plane passing through an axial center.

FIG. 3 shows a configuration of a section in a seal main body deformed by high pressure as a result of performing the pressure durability test of the lip type seal in the conventional structure and the present invention structure under following test conditions:

Test Conditions rotational frequency: 2500 rpm pressure: 10 MPa [gage]

oil temperature: synthetic oil oil amount: filled in the sealed space time : one hour As a result of the above-mentioned test, in the lip type seal in the conventional structure, as shown in FIG. 3(A), it is recognized in the bent part that an entering deformation a is produced between the inner diameter of the rear surface support plate and the rotary shaft. On the contrary, in the structure of the present invention, generating of such entering is not recognized.

In addition, as means for stopping rotation of the movable support plate 34 relative to the rear surface support plate 33 and for engaging the movable support plate 34 with the rear surface support plate 33 movably in a diameter direction, in contrast to the shown example, the engaging protrusions may be formed on the side of the rear surface support plate 33 and the engaging grooves may be formed on the side of the movable support plate 34. Or otherwise a pin projected either on the rear surface support plate 33 or on the movable support plate 34 and a recess extending in a radial direction formed on the other side of the former two may be loosely engaged with each other. Other various means may be further considered.

According to the lip type seal of the present invention, the seal main body is clearance fitted to the rotary shaft and is supported to the rear surface support plate through the movable support plate movable in a diameter direction. Therefore, even under the condition of high pressure, such a state does not occur that the seal main body enters between the inner diameter of the rear surface support plate and the outer circumferential surface of the rotary shaft and is damaged. Pressure durability of the lip type seal can be raised.

What is claimed is:

1. A lip sealing structure comprising:

a housing (1) having a seal attaching portion (12);

a rotary shaft (2) having an outer surface, the rotary shaft (2) being rotatably provided relative to the housing (1);

a lip type seal positioned between the seal attaching portion (12) and the rotary shaft (2) for sealing the rotary shaft (2) so as to define a sealed space (A);

the lip type seal including:

a seal main body (32) having a rear side and an inner peripheral portion which is bent into the sealed space (A) and contacts the outer surface of the rotary shaft (2) in a sealing condition;

a rear surface support plate (33) placed at the rear side of the seal main body (32) and fixed relative to the seal main body (32);

a movable support plate (34) placed between the seal main body (32) and the rear surface support plate (33), the movable support plate (34) being movable in a radial direction.

2. A sealing structure as defined in claim 1, wherein the rear surface support plate (33) and the movable support plate (34) have such an engaging relationship between plural projections and plural grooves that the movable support plate (34) can move in radial direction.

3. A sealing structure as defined in claim 1, wherein the rear surface support plate (33) has an annular recess (332) in which the movable support plate (34) is arranged.

4. A sealing structure as defined in claim 2, wherein the projections and the grooves extend in a radial direction from the rotary shaft (2).

5. A lip type seal comprising:

an outer ring part tightly fitted to a seal installation part of an inner circumference of a housing of an equipment;

a seal main body fixed to the outer ring part and whose inner circumferential part extending in a bent state to the side of a sealed space is sealably brought into slidable contact with an outer circumferential surface of a rotary shaft inserted in the inner circumference of the housing;

a rear surface support plate arranged on the rear side of the seal main body and whose outer circumferential part together with the seal main body is fixed to the outer ring part; and a movable support plate engaged movably in a radial direction between the seal main body and the rear surface support plate and whose inner diameter is clearance fitted to the outer circumferential surface of the rotary shaft.

\* \* \* \* \*